United States Patent
Cohen

(10) Patent No.: US 7,310,721 B2
(45) Date of Patent: Dec. 18, 2007

(54) SHADOW PAGE TABLES FOR ADDRESS TRANSLATION CONTROL

(75) Inventor: Ernest S Cohen, Wyncote, PA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 10/697,197

(22) Filed: Oct. 30, 2003

(65) Prior Publication Data

US 2005/0097298 A1 May 5, 2005

(51) Int. Cl.
*G06F 12/10* (2006.01)
(52) U.S. Cl. .................. 711/206; 711/207; 711/208; 711/162
(58) Field of Classification Search ............... 711/206, 711/207, 208, 162
See application file for complete search history.

(56) References Cited

U.S. PATENT DOCUMENTS

| | | | |
|---|---|---|---|
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 6,233,668 B1 * | 5/2001 | Harvey et al. | 711/206 |
| 2003/0177435 A1 * | 9/2003 | Budd et al. | 714/776 |
| 2003/0200402 A1 | 10/2003 | Willman et al. | 711/154 |
| 2003/0200412 A1 | 10/2003 | Peinado et al. | 711/202 |
| 2004/0003262 A1 | 1/2004 | England et al. | 713/189 |

OTHER PUBLICATIONS

Bugnion, E. et al., "Disco:Running Commodity Operating Systems on Scalable Multiprocessors", *Proceedings of the 16th Symposium on Operating Systems Principles (SOSP)*, Oct. 1997, 1-14.
Goldberg, R.P., "Survey of Virtual Machine Research", *Computer*,Jun. 1974, 34-45.
Popek, G.J. et al., "Formal Requirements for Virtualizable Third Generation Architectures", *Communications of the ACM*, Jul. 1974, 17(7), 412-421.
Smith, J.E., "An Overview of Virtual Machine Architectures", Oct. 26, 2001, 1-20.
Waldspurger, C.A., "Memory Resource Management in VMware ESX Server", *Proceedings of the 5th Symposium on Operating Systems Design and Implementation*, Dec. 9-11, 2002, 15 pages.
Coffing, C.L., "An x86 Protected Mode Virtual Machine Monitor for the MIT Exokernel", *Submitted to the Department of Electrical Engineering and Computer Science at the Massachusetts Institute of Technology*, May 1999, 109 pages.

* cited by examiner

*Primary Examiner*—Sanjiv Shah
*Assistant Examiner*—Jae Un Yu
(74) *Attorney, Agent, or Firm*—Woodcock Washburn LLP

(57) ABSTRACT

In a computer system that employs virtual memory, multiple versions of a given page are stored: a directory version, a table version, and a data version. The data version contains the data that a software object believes to be stored in the page. The directory and table versions of the page contains versions of the page's contents that have been modified in some manner to comply with a restriction on the address translation map employed by the virtual address system. When a page is being used by the virtual address system as a directory or table, then the directory or table versions, respectively, of that page are used. When a page is the target of a read request, the data version of the page is used.

24 Claims, 6 Drawing Sheets

300

| PFN (302) | L/S (304) | R/O (306) | Pres. (308) |
|---|---|---|---|

SHADOW PAGE TABLES FOR ADDRESS TRANSLATION CONTROL

FIELD OF THE INVENTION

The present invention relates generally to the field of memory management in a computer, and, more particularly, to the management of the address translation tables in a virtual address system.

BACKGROUND OF THE INVENTION

Modern computer systems typically provide some type of virtual address mechanism. As is known in the art, each individually-accessible unit of memory associated with a computer system has a physical address that uniquely identifies that unit of memory. However, in a computer system that supports virtual addressing, it is possible to assign virtual addresses to the physical locations. The virtual address system uses a translation map to translate the virtual address into a physical address.

One feature of a virtual addressing system is that it is possible to configure the address translation maps such that certain sets of physical address (e.g. pages of physical memory) does not have any virtual address. In a typical page-based memory management scheme, the address translation map translates virtual page descriptors into physical page frame numbers. Thus, all of the locations in a given physical page frame can be denied virtual addresses by ensuring that the address translation map does not lead to that page frame. More generally, many virtual addressing schemes tag virtual addresses with accesses that can be performed through the virtual address (e.g. read, read/write); selected accesses to a page (e.g. writes) can be prevented by ensuring that no virtual address mapping to the page allows the denied access. This facet of the address translation map can be used to implement a form of memory protection. Thus, a software object (e.g., an operating system, an application level process, or any other type of software object) can be denied access to a page of the physical address space by ensuring that any map exposed to that software object is in such a state that no virtual address mapping to the page in question permits the access. This type of memory protection scheme is particularly useful in the IA32 family of processors (e.g., the INTEL x86 processors), because the architecture of the INTEL x86 processors is such that when operating in protected mode (the processor's normal operating state), all memory access requests go through virtual address translation. A memory protection scheme that works by prohibiting supervisor-mode programs from modifying translation tables in a manner that would permit certain access to certain physical addresses is referred to as "Address Translation Control," or ATC.

In typical architectures (like the x86), the translation from virtual to physical addresses is given by the contents of ordinary memory pages (so-called "page map" pages). This is convenient for writing operating systems, because virtual address maps can be created and modified by ordinary memory operations. If the operating system is to be confined using ATC, then ATC must prevent the operating system from having a mapping that allows it to write directly into page map pages, since the operating system could use writes to such pages to create mappings giving it arbitrary access to arbitrary physical memory pages. Thus, in addition to preventing read-write mappings to pages that the software object is not allowed to write, ATC has to prevent "unsafe" maps that include read-write mappings to page map pages.

While memory isolation by ATC is effective, one problem that arises is how to deal with write requests that create unsafe maps but do not themselves violate the access control policy. One way to deal with such a write request is for the request simply to fail; however, this would require substantial revision to the operating system. Thus, some current ATC algorithms modify either the written value (e.g. to change a read-write mapping to a page map page to a read-only mapping) or modify other page map pages to make the map safe. The problem with this technique is that the software object will execute the write request believing that a specified value is being written to the target location when, in fact, that location will end up containing a different value. This discrepancy can reverberate in various ways— e.g., a software object may generate a checksum based on the values that the software thinks have been stored, and these checksums will not validate against the modified value generated by the ATC system.

A benefit of one embodiment of the present invention is to provide an environment where writes that create unsafe maps (but obey the security policy) appear to succeed unmodified (from the standpoint of the software object), but where the resulting maps cannot be exploited to circumvent the security policy, thereby overcoming the drawbacks of the prior art.

SUMMARY OF THE INVENTION

The present invention provides for the use of shadow pages to support address translation control. In a typical virtual addressing system, a given page can be a map page (containing data that is part of the map) or a data page (the target of some virtual address) or both. Map pages and data pages are accessed in different contexts: entries in data pages are the targets of underlying read or write requests; entries in map pages, on the other hand, are dereferenced in order to locate other pages. The invention maintains multiple copies of pages corresponding to the different contexts in which a page can be used (e.g., as a directory, a table, or a data page, as explained below). The invention uses the appropriate copy of the page depending on the context in which the page is being accessed.

Some virtual addressing systems (such as the most common virtual address mode used on the INTEL x86 family of processors) have two types of map pages: directories and tables. Directories contain references to tables and large data pages, and tables contain references to small data pages. ("Large" and "small" pages are more particularly described below.) Thus, from the perspective of the address translation process, there are up to three different contexts in which a given page can be accessed: as a directory, as a table, or as target data. In a preferred embodiment, up to three versions of a given page are maintained: a directory version, a table version, and a data version. When a given page is accessed, that page's directory, table, or data version is used depending on the context in which the page is being accessed.

Under ATC, the content of a page can cause violation of a memory access policy only if the page is used as a directory or table. For example, a page may contain a link to an off-limits page. However, the danger that this page will be used to access the off-limits page is only present if the address translator is actually using the page as part of a map; if the page is instead being accessed as a data page, then it does not expose a virtual address for the off-limits page. Thus, the data copy of the page may contain the actual data that the software object believes it has written to the page, while the directory and table copies of the page may contain modified versions that present a safe map.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Address translation control can be used to implement a memory access control policy by effectively denying virtual address mappings that could be used to violate the policy. In general, address translation control works by imposing substantive limits on attempts to edit the address translation map, such that the map always remains safe (in the sense that the map does not expose, to a given software entity, links (or writeable links) to pages that are off-limits to (or non-writeable) by that entity, and does not allow an untrusted entity to write to the map). Typically, these substantive restrictions are imposed by evaluating requests to edit the map to determine if carrying out the request would place the map in an undesirable state; if an undesirable state would result, then the request is modified so that carrying out the desired request maintains the desired state. (E.g., a request to edit a map that would result in a read/write link to a page that is readable but not writeable under the policy can be modified to mark the link as read-only.) The problem with this technique is that sometimes correct behavior of software is dependent on memory containing the values that the software believes it has written to the memory—e.g., in the case of verifying a checksum—and modifying a request will cause the memory to contain a different value than the software believes it has written. The present invention addresses this problem by maintaining different versions of pages used as page map pages: a data version that is exposed to the software object, and one or more map versions that can be used as part of the address translation process without violating map safety. Maps to the data version of such a page are made read-only, so that writes to the page can be intercepted by ATC, which can edit the pages so as to keep the different version synchronized.

Exemplary Computing Arrangement

Figure 1:
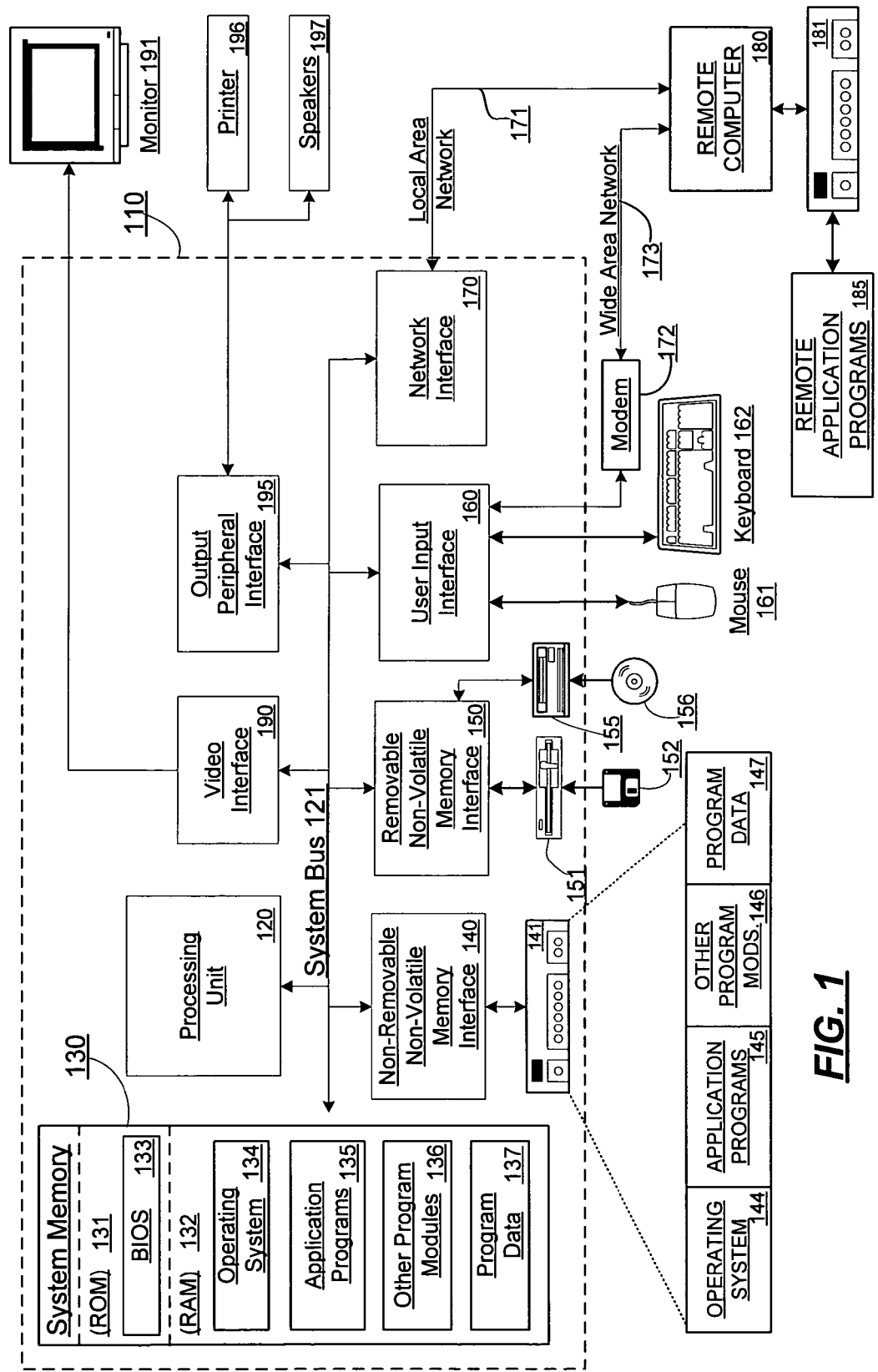
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Virtual Address Scheme

Figure 2:
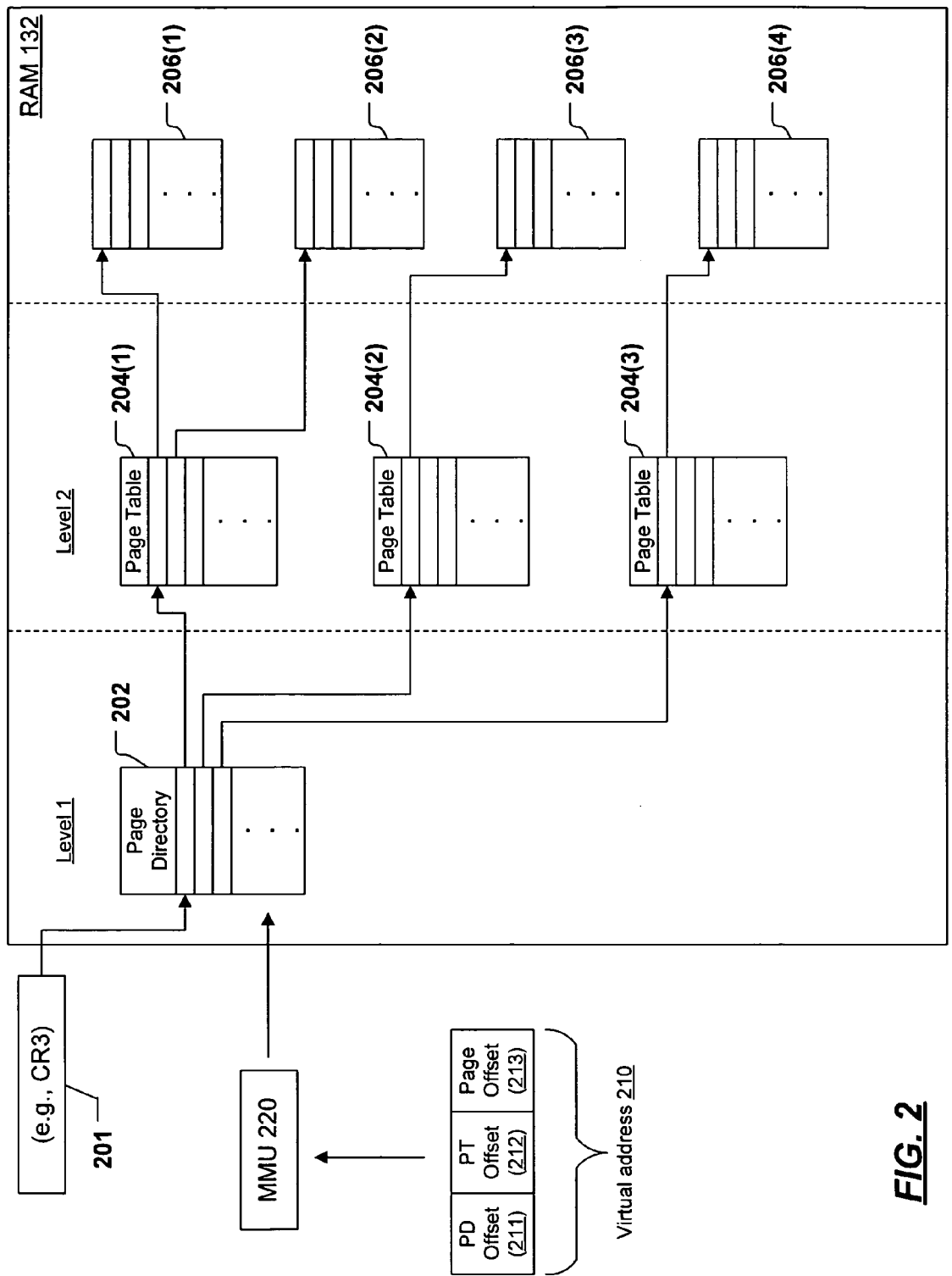
FIG. 2 is a block diagram of an example virtual address system.

FIG. 2 shows an example of a virtual address system. The example depicted in FIG. 2 is a page-type virtual address scheme, although it will be understood that virtual addressing can be based on other models, such as segmentation. The scheme shown in FIG. 2 is a two-level address scheme, such as one of the virtual addressing schemes available on the INTEL x86 processor. The scheme is "two-level" in the sense that one must use two levels of indirection to translate a virtual page identifier into a physical page, as described below.

In this paging scheme, page directory 202 contains a set of entries. An example structure of an entry is more particularly described below in connection with FIG. 3, but, in essence, each entry identifies the physical location (i.e., page frame number or "PFN") of a particular page table, such as page tables 204(1), 204(2), or 204(3). Each page table, in turn, contains a set of entries, where each entry identifies the physical location (again, the page frame number) a particular data page, such as pages 206(1), 206(2), 206(3), or 206(4). Data pages are defined-length contiguous portions of RAM 132. Data pages may store any type of data, and, it should be noted that, in addition to storing ordinary data, data pages are also used to store the contents of page directory 202 and pages 204(1) through 204(3). Thus, a given page could be a directory, a table, a data page, or could play multiple roles as any combination of those three structures.

The virtual address scheme depicted in FIG. 2 is a two-level virtual address scheme, since it is necessary to go through both a page directory (level 1) and a page table (level 2) in order to locate a particular page. It will be appreciated by those of skill in the art that it is possible to design a virtual address system with an arbitrary number of levels, and the principles of the present invention can be applied to all such virtual address schemes. As is known in the art, the INTEL x86 processor supports virtual addresses having one, two, or three levels, and typically employs a "hybrid" scheme, in which "small" pages (i.e., pages that are four kilobytes in length) use two-level virtual addresses, while "large" pages (i.e., pages that are four megabytes in length) use one-level virtual addresses.

In the paging scheme of FIG. 2, any byte on a page can be identified by a virtual address 210, comprising a page directory offset 211, a page table offset 212, and a page offset 213. (This structure of a virtual address applies to data stored in small pages; large pages are described below.) Thus, in order to locate a physical address, a memory management unit (MMU) 220 that performs the translation of addresses uses page directory offset 211 to locate a particular entry in page directory 202. For example, offset 211 may be equal to zero, indicating that the zero-th entry in page directory 202 should be consulted. This entry contains the PFN at which a page table is stored, so MMU 220 uses this PFN to locate one of the page tables (e.g., page table 204(1)). MMU 220 then uses page table offset 212 as an index into the identified page table, and retrieve the entry found at that offset. The entry contains the PFN of a data page (e.g., page 206(1)), so MMU 220 adds page offset 213 to the base address of the identified page in order to locate a particular byte of physical memory. MMU 220 may also be adapted to perform various other functions in addition to the mere translation of addresses: e.g., MMU 220 may load the page from disk if the page's entry in the table is marked "not present"; MMU 220 may disallow write access if the page is marked "read-only," etc.

If the virtual address refers to a large page, the structure of a virtual address, and the process of translating that address, are slightly different from that described above. The virtual address contains only one offset, which is an index into the directory. The directory entry located at that offset, instead of containing the PFN of a page table, contains the PFN of a large data page. The directory entry also has a bit that is set to indicate that the entry refers to a large page instead of a page table. When the large page bit is set, the virtual address does not contain an index into a page table, so no page table is used in the translation process; instead, the remainder of the virtual address (i.e., the portion other than the index into the directory) is treated as an index into the large page. The page table level is bypassed, so only one level of translation takes place.

In the virtual address scheme of FIG. 2, the location (i.e., PFN) of the page directory itself is stored in a storage location 201. MMU 220 uses the contents of this storage location to locate the page directory 202 when it begins to translate virtual address 210. Thus, there can be multiple page maps in existence, and a particular map can be selected for current use by setting the contents of storage location 201 to contain the PFN of a given map's page directory. In the example of an INTEL x86 processor, storage location 201 corresponds to the register named CR3.

Figures 3, 4:
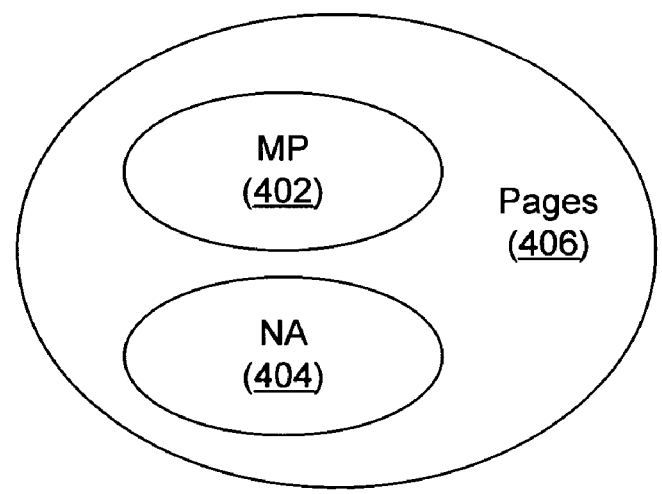
FIG. 3 is a block diagram of an example entry in an address translation map.
FIG. 4 is a block diagram of an example invariant condition for memory access control through address translation control.

As noted above, each entry in a page table or page directory contains the PFN of a particular physical page, and may also contain certain other data. FIG. 3 shows an example structure for an entry 300 in a page table or page directory.

Entry 300 includes the PFN 302 of a particular physical page. For example, if entry 300 is part of a page directory, then PFN 302 is the PFN of the page table that should be consulted in the next level of the address translation process (or, in the case of a large page link, the entry simply contains the PFN of the large data page to which the entry refers). Additionally, entry 300 contains a bit 304 indicating whether the entry is for a large page or a small page. (This bit will have meaning only when entry 300 is part of a page directory. For the sake of simplicity, the format of an entry may be the same whether the entry is part of a directory or a table, although in the case of a table, the meaning of bit 304 will be undefined.)

Read-only bit 306 indicates whether the data page that is the ultimate target of the entry is to be treated as read/write (bit cleared) or read-only (bit set). If the target data page is read-only, then write requests to that page will fail. (MMU 220 can be used to enforce the read-only status of a page.) The read-only bit can exist in both directory and table entries; if the directory and table links that ultimately lead to a data page have conflicting settings of their respective read-only bits, a conflict resolution rule can be used to determine whether the target data page is read/write or read-only. For example, the conflict rule may state that, in order for a page to be treated as read/write, both the directory and table links that lead to that page must be marked read/write (i.e., the read-only bit 306 in both entries must be cleared). The same page may be reachable by different paths through the map, and whether the page is treated as read/write or read-only may depend on which path is used to reach that page.

Present bit 308 indicates whether the target data page is currently present in physical memory, or needs to be copied into memory from disk. For example, if present bit 308 is cleared (indicating that the target page is not present), an access request on that page may generate a page fault, which is then handled by an interrupt service routine that copies the contents of the page from disk into physical memory and adjusts the address translation map to reflect the page's physical location. Where the present bit is set differently in the page directory and page table entries for a given mapping, the conflict between these bits can be resolved by a conflict resolution rule similar to that discussed above for the read/write bit—e.g., the mapping is treaded as present if and only if both the directory and table entries are marked present.

Memory Access Control using Address Translation Table Entry Edit Control (ATC)

One feature of the virtual address scheme described in connection with FIGS. 2-3 is that it is possible for there to be a portion of physical memory for which no corresponding virtual address exists. A corollary of this observation is that, given any portion of memory, it is possible to restrict access to that portion of memory by ensuring that the address translation map does not lead to that portion of memory. In effect, a memory location is rendered off limits because that memory location has no virtual address. (In many systems—e.g., the INTEL x86 processor—nearly all memory access requests are made by virtual address; for those limited circumstances in which access requests are made by physical address, a parallel access control mechanism can be used.)

The way in which ATC is used to achieve memory access control is explained in terms of the following notation: NA ("no access") is the set of pages to which access is disallowed under some policy. MP ("mapped pages") is the set of pages that are accessible via the address translation map—i.e., the set of pages for which a virtual address exists. Access to the pages that are members of NA can be prevented, as long as the condition NA∩MP=φ continues to hold true. This condition is depicted in FIG. 4 as a Venn diagram: i.e., pages 406 is the set of physical pages available on the machine; MP 402 is the set of pages for which virtual addresses exist; NA 404 is the set of pages to which access is not allowed under the policy. As long as the condition in FIG. 4 continues to be true, it will not be possible to use virtual addresses to access pages that are off-limits under the policy, because the map does not lead to these pages (i.e., the pages have no virtual address). Thus, the condition depicted in FIG. 4 can be used to achieve memory access control through ATC. This condition is called an "invariant," since the goal of ATC is to limit changes to the address translation map in order to prevent the condition from changing from a state of truth to a state of untruth.

FIG. 4 depicts a simple invariant condition that can be used for memory access control, and is shown only for the purpose of illustration. More complex conditions are possible depending on the environment in which access control is to take place. For example, it is possible to set specific rules about what entries may be contained in a directory (or in a table), and to refine access control by using the read-only and/or present bits to help enforce the access control condition. For example, the following describes an example of a set of rules that can be used to achieve memory access control through ATC on an INTEL x86 processor:

D1 is the set of pages that can be used as page directories. D2 is the set of pages that can be used as page tables. D=D1∩D2. Each entry in a page directory or page table that is marked "present" (i.e., whose present bit is set) is called a "link." A page in D2 is "write-active" if there is a small read-write link from some page in D1 to the D2 page in question. (A "small" link is a link from a directory to a table—i.e., a link in a directory that will ultimately lead to a small page. A "large" link is a link in a directory that points to a large page.) It is assumed that there is a policy that defines the pages to which some entity is permitted read and/or write access.

The following invariants are maintained:
CR3 is in D1;
all D1 and D2 pages are readable under the relevant policy;
every small link from a D1 page points to a D2 page;
links from D2 pages point to a page that is readable under the policy;
every read-write link from a write-active D2 page points to a page that is writeable under the policy and that is not in D;
every small page contained in the large page target of a large link from a D1 page is readable under the policy; if the link is read-write, then the small page is also writable under the policy and is not in D.

ATC is used to ensure that changes to the address translation map that would violate the above invariants are prevented. Maintaining these invariants ensures that the entity in question cannot violate the policy.

Regardless of which invariant is being imposed, the truth of the invariant can be maintained by evaluating each access request to determine whether the request, if actually carried out, would result in a state under which the invariant continues to hold. If the resulting state would satisfy the invariant, then the request is carried out. If, however, the invariant would fail to hold, then there are at least two options:

(1) Deny the request; or
(2) Modify the request into a form that will continue to satisfy the invariant.

Option (1) has the disadvantage that, in practice, a large number of access requests will need to be denied, which is disruptive to the functioning of a computer system. With option (2), however, a software object will write a value into a storage location, and the storage location can end up storing a modified value that is different from the value that the software object believes that it wrote; as previously noted, the correct functioning of the software (e.g., checksum verification) may depend on the memory storing the actual values that the software believes that it wrote to the memory, and thus option (2) can also be disruptive to the functioning of the software. The invention addresses this problem by storing multiple versions of a page. One version contains the exact data that a program believes it is writing to the page. Other copies of the page contain versions of the data that, if used in the address translation process, will cause the relevant invariant condition to be maintained.

Shadow Pages

According to one feature of the invention, there may be multiple representations of a page. Multiple representations of the same page ensures that there is a version of the page that contains the data that a program actually writes to the page, and other ("shadow") versions of the page that are safe to use in the address translation process as page directories and page tables. "Safe to use," in this context, means that use of the shadow page as a directory (or table, as the case may be) will not cause the invariant applied by the ATC system to be violated.

Preferably, given a page x, there are three versions that page, which shall be referred to as d(x), t(x), and m(x). d(x) is the "directory" version of the page—i.e., the version of the page that is suitable to use as a page directory in the address translation process described above. t(x) is the version of the page that is safe to use as a page table. m(x) is the "memory" version of the page—i.e., the version that contains the actual data that has been written to the page by one or more programs. In the description herein, the term "d(x)" can refer either to the contents of the directory version of page x, or else to the PFN at which the directory version of page x is stored. Likewise for t(x) and m(x). Whether the terms d(x), t(x), and m(x) refer to a page's contents, or to its PFN, will be clear from context, or else will be specifically indicated.

Figure 5:
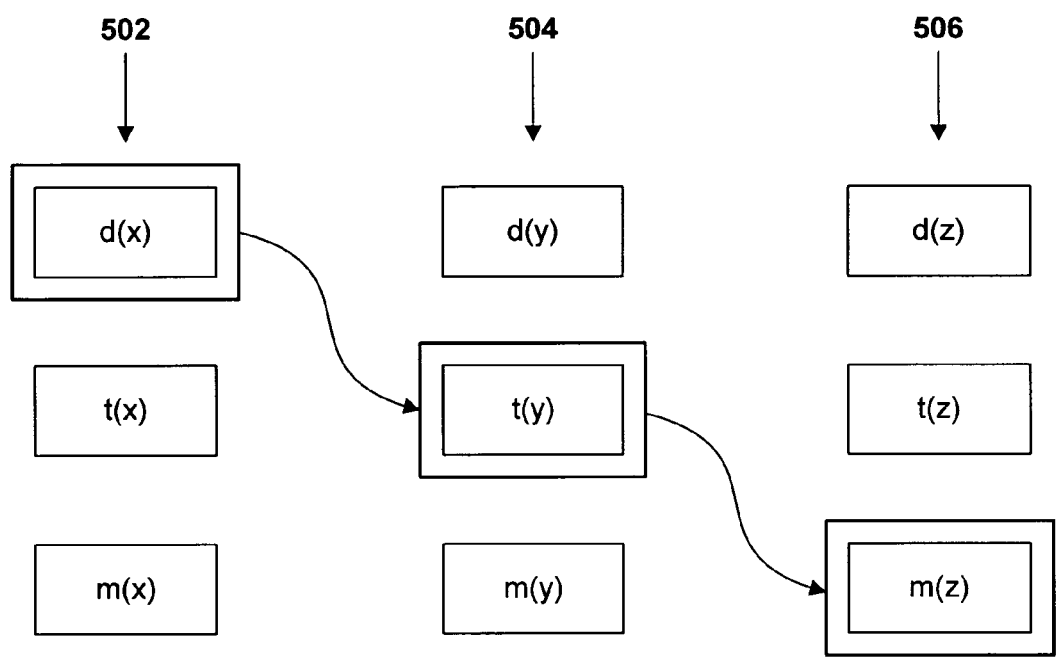
FIG. 5 is a block diagram of pages that exist in plural versions, where a different version of a page is employed depending on the context in which the page is used.

FIG. 5 shows how d(x), t(x), and m(x) are used in the address translation process. FIG. 5 refers to three pages, labeled x, y, and z (reference numerals 502, 504, and 506, respectively). Page x is a page directory, page y is a page table, and page z in a data page. It should be noted that pages x, y, and z may play multiple roles. Thus, x may function as either a page directory or a data page, depending on the circumstances. Page y may function as a page table in some contexts and a page directory in other contexts. However, it is assumed for the purpose of FIG. 5 that a particular virtual address is being translated, and, for the purpose of translating that address, pages x, y, and z take on the roles of directory, table, and data page, respectively.

Page x exists in versions d(x), t(x), and m(x). In order to translate the address in question, the directory version of page x (i.e., d(x)) is consulted. As a directory, the entries in x contain the PFNs of the target page tables, and the principle difference between x and d(x) is that for each target $t_i$ in page directory x, x contains the PFN of $t_i$, while d(x) contains the PFN of t($t_i$)—in other words, d(x) is modified to point to the table versions of the target pages instead of the original versions of those pages.

When page d(x) is consulted, the relevant entry in d(x) (i.e., the entry indicated by the directory offset portion of the virtual address, element 211 in FIG. 2) points to page t(y). Page t(y) is then consulted to locate a particular data page. The entries in t(y) contain the PFNs of target data pages. The relationship between t(y) and y is analogous to the relationship between d(x) and x: For each data page $d_i$ referred to by y, t(y) contains the PFN of m($d_i$) instead of the PFN of $d_i$. (It should be noted, however, that the PFN of m($d_i$) is generally the same as the PFN of $d_i$, since storing the data version of a page in the page's original location is generally the most efficient use of memory.) Using the offset indicated by the table offset field of the virtual address (e.g., element 212 in FIG. 2), the appropriate entry in table t(y) is located. That entry refers to the PFN of a particular data page, which, in this example, is m(z).

After page m(z) is identified, the appropriate unit of data in page m(z) is accessed, based on the page offset indicated in the virtual address (element 213 in FIG. 2).

Thus, in a conventional address translation process, the path to the data page leads from page x, to page y, to page z. When shadow page tables according to the invention are used, the translation page leads from page d(x), to page t(y), to page m(z).

Creating Pages d(x), t(x), and m(x)

Pages d(x), t(x), and m(x) are created by performing defined transformations on page x. The following is a description of a preferred embodiment of those transformations.

Preferably, m(x) represents the actual data that programs write to page x, without any type of modification or filtering. In other words, the transformation from x to m(x) is essentially the identity transformation.

Preferably, d(x) and t(x) are created according to the following rules. d(x) is the same as x, except that for every page $t_i$ referred to an entry of page x that is marked present, the corresponding entry in d(x) refers to the PFN of t($t_i$) instead of the PFN of $t_i$. t(x) is the same as x, except that, for each page $d_i$ referred to in an entry of page x that is marked present, t(x) refers to the PFN of m($d_i$) instead of the PFN of $d_i$. Additionally, if the target page is readable but not writeable under the relevant policy, or if the target page is a page directory or page table, then the entry is marked read-only.

The following is a more formal description of how d(x) and t(x) are created. For the purpose of this description, D1 is the set of PFNs that are usable as page directories, and D2 is the set of PFNs that are usable as page tables. The statement D1.x means that x is a member of D1, and D2.x means that x is a member of D2. Let M be the memory map, as seen by the relevant software object on which a memory access control scheme is to be enforced. M.x.e refers to the value stored in the $e^{th}$ entry of the physical page that whose PFN is x. R.x means that x is readable under the relevant policy, and W.x means that x is writeable under the relevant policy. m,t,d, and P are such that the following hold (in each case, let v be M.x.e, and let D.x=D1.x∨D2.x):

If ¬R.x, m.x=t.x=d.x=undefined, where "undefined" is a pfn of a page not in physical memory.
d.x=if D1.x then x else undefined
¬D2.x⇒t.x=undefined
P.(m.x).e=v (i.e., in P, m.x looks exactly like x does in M)
d.x≠undefined⇒P.(d.x).e=if v.present then v [pfn←t.(v.pth)] else v
t.x≠W undefined⇒P.(t.x).e=if v.present then v [pfn←m.(v.pfn), rw←(v.rw ^ (R.(v.pfn)⇒W.(v.pfn))^ ¬D.(v.pfn))] else v In other words, the directory version of x looks just like the memory version of x but with pfns redirected to table versions; the table version of x looks just like the memory version of x but with pfns redirected to read versions, and with read-write bits cleared for targets that are readable but not writable, or in D (or else read-only bits set for such targets, depending on whether the representation of an entry includes a read/write bit or a read-only bit). Note that for directories, we keep the directory version of x at x, but for tables, we keep the read version of x at x to minimize the cost of removing x from D2 (e.g., to swap it to disk). Whenever versions happen to hold the same data (e.g., for directories and tables that ATC would have allowed), they share the same physical page, so for a software object that does not try to do writes that ATC would reject or modify, no shadow pages need to be created.

Figure 6:
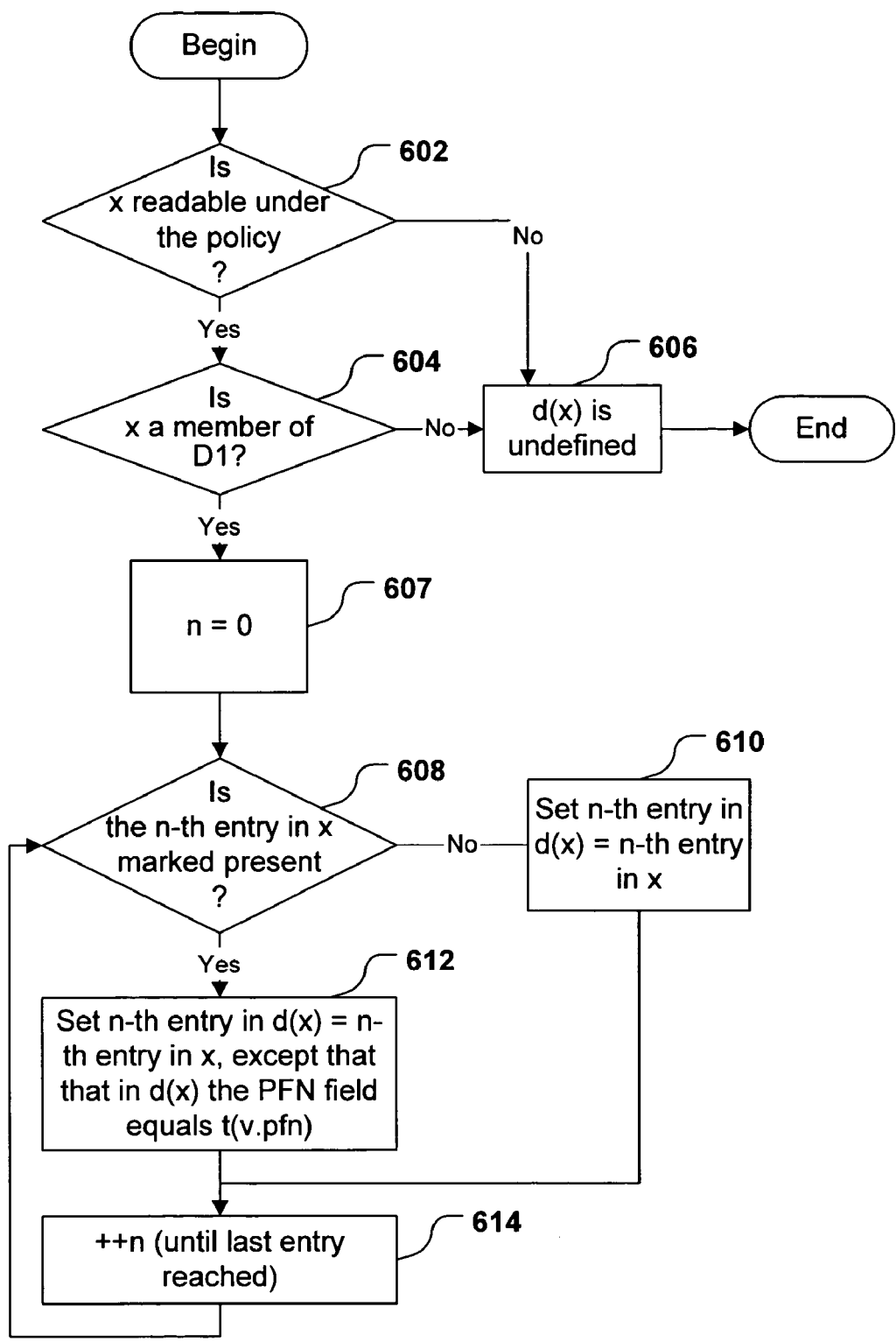
FIG. 6 is a flow diagram of an example process for deriving the directory version of a page.
Figure 7:
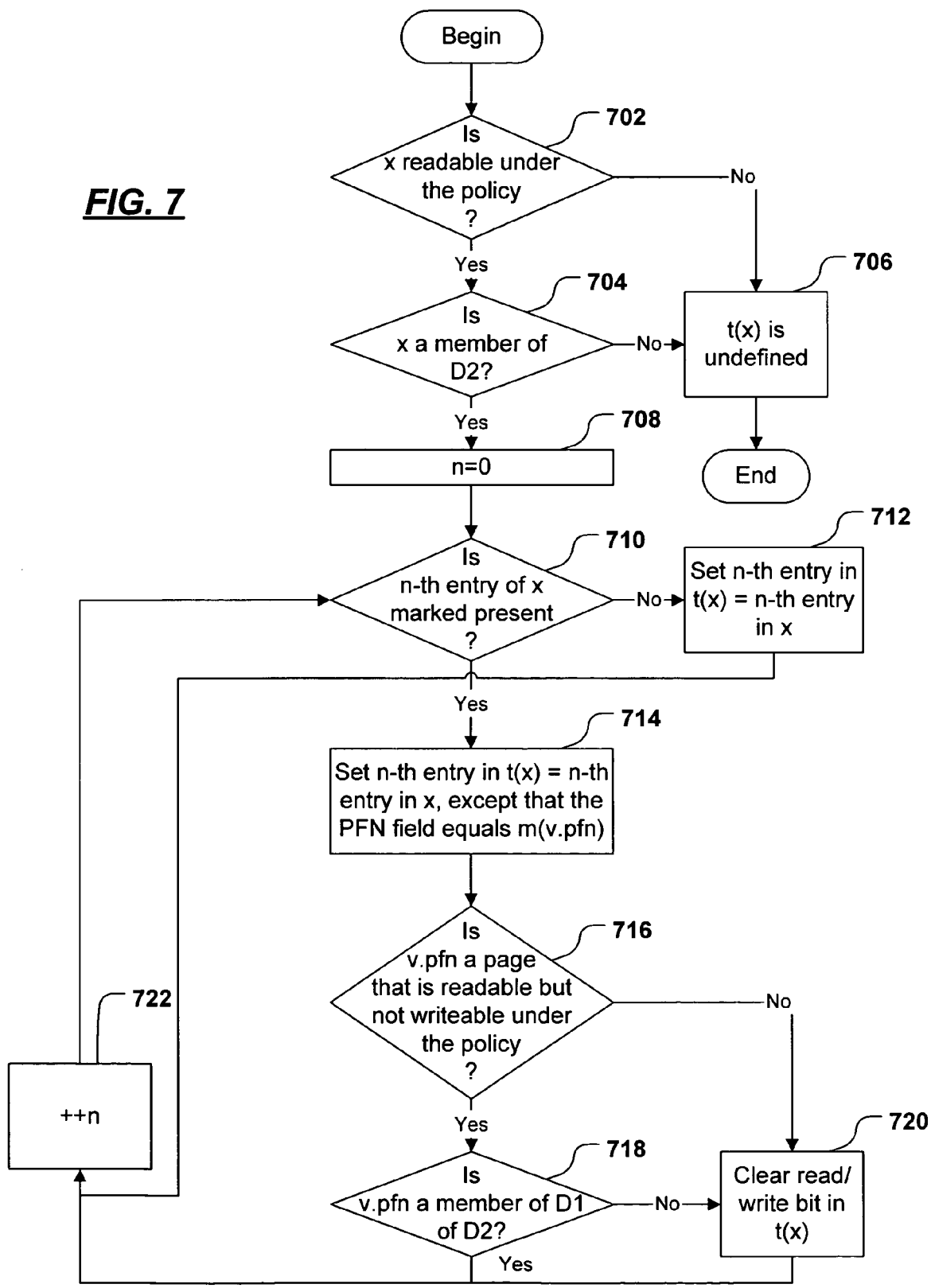
FIG. 7 is a flow diagram of an example process for deriving the table version of a page.

FIGS. 6 and 7 show example processes for creating d(x) and t(x), respectively.

Referring now to FIG. 6, it is assumed that there is a page x that is part of a map (i.e., map M, as described above), and it is desired to create the page d(x) based on x. First, it is determined (602) whether page x is readable under the relevant policy. If x is not readable, then d(x) is undefined (606), and the process terminates. If x is readable, then it is determined (604) whether x is a member of D1—i.e., whether x has been designated as being usable as a page directory. If x is not a member of D1, then d(x) is undefined (606). If x is a member of D1, then the page d(x) is created such that it contains the same content as page x, except the PFN fields in entries marked present are changed to point to the table versions of their targets. This result can be achieved by setting n=0 (607), and then, for a given value of n, determining whether the n-th entry in x is marked present (608). If the n-th entry in x is not marked present, then the n-th entry in d(x) can be set equal to the n-th entry in x (610). If the n-th entry in x is marked present, then the n-th entry in d(x) is set equal to the n-th entry in x, except that the PFN field is changed to point to the table version (612)—i.e., if P.n.pfn refers to PFN field of page P, and if v has the meaning described above, then d(x).n.pfn=t(v.pfn). After the n-th entry in d(x) has been set, n is incremented (614), and the process returns to 608 to set the next entry.

Referring now to FIG. 7, it is again assumed that there is a page x that is part of a map, and that it is desired to create page t(x). Initially, it is determined (702) whether x is readable under the relevant policy. If x is not readable, then t(x) is set to an undefined value (706), and the process terminates. If x is readable under the policy, then it is determined (704) whether x is a member of D2. If x is not a member of D2, then t(x) is set to an undefined (706). If x is a member of D2, then the page t(x) is created such that the values in the entries are equal to those in x, except that the PFNs of pages marked as present are adjusted so that they point to the memory version of the target page, and certain read/write links are adjusted to make them read-only. In order to create this content for page t(x), initially a counter n is set to 0 (708). It is then determined whether the n-th entry in page x is marked present. If the entry is not marked as present, then the n-th entry in t(x) is set equal to the n-th entry in x (712). If the n-th page is marked present, then the n-th entry in page t(x) is set equal to the n-th entry in x, except that the PFN field of the entry is set to point to the memory version of the target page (714)—i.e., if the target page of the n-th entry in x has PFN=A, then the PFN field of the n-th entry in t(x) is set equal to m(A). (As noted above, the PFN of m(A) is often equal to the PFN of A.) Next, it is determined (716) whether the target page of the n-th entry is a page that is readable but not writeable under the relevant policy. If the target page is readable but not writeable, then the n-th entry in t(x) is marked as read-only (720). Otherwise, it is determined (718) whether the target page of the n-th entry in x is a member of D1 or D2. If so, then the n-th entry in t(x) is marked as read-only (720). The counter n is then incremented (722), and the process loops back to 714 to create the next entry in t(x).

Storing the Shadow Pages

It is possible to store three copies of every page (i.e., d(x), t(x), and m(x)), although there are certain optimizations that allow the pages to be represented more efficiently. First, a shadow page need not be created if the algorithms described above would result in creating a shadow page that is identical to a version that is already stored. Thus, for most pages, only one version of the page need be stored, in which case, for such a page x, the PFNs of d(x), t(x), and m(x) are all the same.

Second, for all pages other than directories, it is preferable for the original copy of page x to serve as the data version of the page. Thus, for non-directory pages (i.e., pages whose frame number is not a member of D1), the PFN of m(x) is equal to the PFN of x; the directory and table versions of x would be stored elsewhere. In the case of directory pages, however, it is preferably (and, in some cases, necessary) for the original location of the page to serve as the page's directory version. Since the set D1 is defined in terms of the PFNs of pages that are allowed to serve as directories (e.g., on the INTEL x86 processor, those pages whose PFNs can be loaded into CR3), it is not practical to move the directory version to another PFN: since CR3 needs to be loaded by a software object that may be unaware of the existence of shadow pages (e.g., CR3 may be loaded by an operating system whose memory access is being restricted by an ATC system), the directory pages may need to be located at the PFNs where the software object believes those pages are located.

Using Shadow Pages with Large Pages

As discussed above, the INTEL x86 processor (as well as various other processors) supports the use of large pages, in which case no page table is involved in translating a virtual address to a physical address. In order to work large pages into the shadowing mechanism described above, a shadow page table can be created for a large page, even though this shadow page table does not correspond to any real page table. Thus, when a page directory x contains a large link, the directory version of that page (i.e., d(x)) can be created that contains a small link in the entry that corresponds to x's large link. This small link points to a shadow page table (i.e., t(x)), which contains links to the individual small pages that make up a large page. Since part of the shadowing algorithm described above involves marking certain pages as read-only, breaking up a large page into small pages avoids having to mark the entire large page as a read-only page. Individual small pages that are part of the large page can be marked read-only if necessary. (The disadvantage to marking a large page as read-only is that every write request to such a page would generate an exception and would have to be evaluated by a more privileged component (e.g., the component that performs ATC) to determine whether the write can take place without violating the applicable invariant. Requiring every write request to a large page to be treated in this manner can degrade system performance significantly.)

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-readable storage medium having encoded thereon computer-executable instructions to perform a method of creating shadow pages for an address translation map, the address translation map comprising a page directory and a plurality of page tables, the page directory comprising links to the plurality of page tables, each of the page tables comprising links to a plurality of data pages, the page directory and page tables each being stored in one of the data pages, the method comprising:

for at least one of the plurality of page tables, creating a first shadow page table based on said one of the plurality of page tables, said first shadow page table differing from said one of the plurality of page tables in at least one of the following respects:

at least one entry in said first shadow page table links to a different data page than that entry's corresponding link in said one of the plurality of page tables; and said first shadow page table contains one or more read-only links whose corresponding links in said one of the plurality of pages tables are read/write; and creating a shadow page directory based on the page directory, the page directory comprising a link to said one of the plurality of page tables, said shadow page directory comprising a link to said shadow page table instead of the link to said one of said plurality of page tables, wherein an item of software uses said page table to perform a non-address-mapping action that depends, for correct operation of said item of software, on data being present, in said one of said plurality of page tables, that said item of software has previously written to said one of said plurality of page tables and that said item of software expects to be present in said one of said plurality of page tables, said data having a characteristic that is present in said one of the plurality of page tables but not present in said first shadow page table, wherein said first shadow page table is used to translate addresses for said item of software and said one of the plurality of page tables is not used to translate addresses for said item of software.

2. The computer-readable storage medium of claim 1, wherein a policy governs access to a memory, wherein access to said memory based on said address translation map applied to said virtual address results in violation of said policy, and wherein access to said memory based on said shadow page directory and said first shadow page table being applied to said virtual address does not result in violation of said policy.

3. The computer-readable storage medium of claim 1, wherein each of the data pages is stored at a particular frame of a memory, wherein said page directory is stored at a first frame, and wherein the method further comprises:
   maintaining a copy of said page directory at a second frame different from said first frame; and
   storing the shadow page directory at said first frame.

4. The computer-readable storage medium of claim 1, wherein said page directory comprises a link to a first-sized page, said first-sized page comprising a plurality of second-sized pages, and wherein the method further comprises:
   creating a second shadow page table that comprises links to said plurality of second sized pages, wherein said shadow page directory comprises a link to said second shadow page table.

5. A system for managing the use of a memory comprising:
   a memory comprising a plurality of individually-addressable components that can be read and written, each of the individually-addressable components having a physical address associated therewith;
   an address translation data structure that defines a mapping between virtual addresses and the physical addresses of the individually-addressable components;
   a memory manager that receives a request to access a first one of the individually-addressable components, said request identifying said first one of the individually-addressable components based on a virtual address, said memory manager translating said virtual address into the physical address of said first one of the individually-accessible components based on data that comprises a shadow representation of said address translation data structure, there being an item of software that uses said address translation data structure to perform a non-address-mapping action that depends, for correct operation of said item of software, on data being present, in said address translation structure, that said item of software has previously written to said address translation structure and that said item of software expects to be present in said address translation structure, said data having a characteristic that is present in said address translation structure but not present in said shadow representation of said address translation structure, wherein said shadow representation of said address translation structure is used to translate addresses for said item of software and said address translation structure is not used to translate addresses for said item of software.

6. The system of claim 5, wherein said memory is organized into a plurality of pages, said first one of the individually-addressable components being located within one of said plurality of pages, wherein said address translation data structure comprises: (1) a plurality of page tables that contain links to said plurality of pages, and (2) a page directory that contains links to said plurality of page tables, and wherein said shadow representation of said address translation data structure differs from said address translation data structure with respect to at least one link.

7. The system of claim 6, wherein each of the links contained in said page directory and said page tables contains one or more attributes, and wherein at least one link in said shadow representation differs from a corresponding link in said address translation data structure with respect to at least one attribute.

8. The system of claim 6, wherein the page directory and each of the page tables is stored in one of said plurality of pages, each of the pages having a physical location descriptor associated therewith, each of the links in the page directory and page tables identifying one of the pages based on the physical location descriptor.

9. The system of claim 8, wherein said shadow representation includes an alternative version of at least one of said page directory or one of said page tables, and wherein said alternative version is stored at a page having a different physical location descriptor from the page on which the alternative version is based.

10. The system of claim 5, wherein a policy governs the accessibility of the memory, wherein the address translation data structure, exposes the memory to violation of the policy, and wherein the system further comprises:
    a memory access control manager that creates the shadow representation based on the address translation data structure and ensures that the shadow representation, if used to access the memory based on virtual addresses, does not result in violation of the policy.

11. The system of claim 10, wherein the policy defines a portion of the memory as inaccessible, and wherein the memory access control manager ensures that the shadow representation does not expose a virtual address for said portion of the memory.

12. The system of claim 10, wherein the policy defines a portion of the memory as being readable but not writeable, and wherein the memory access control manager ensures that the shadow representation contains one or more attributes that mark the portion of memory as being read-only.

13. The system of claim 10, wherein the memory access control manager ensures that the shadow representation contains one or more attributes that mark as read-only those portions of the memory that store at least one of: (1) the address translation data structure; and (2) the shadow representation.

14. A method of executing a memory access request comprising:
    receiving an request to read or write a unit of a memory, said request identifying said unit of said memory based on a virtual address;
    accessing said unit of memory based on a representation of a map that defines a relationship between virtual addresses and physical addresses, said map being stored in one or more pages of said memory, said representation of said map comprising at least one shadow page that is based on a first one of said one or more pages, said map including at least one aspect which, if used to access said memory based on said virtual address, would result in violation of a memory access policy, said shadow page differing from said first one of said one or more pages in a manner such that use of said representation of said map to access said memory based on said virtual address does not violate said memory access policy, there being an item of software that uses said first one of said one or more pages to perform a non-address-mapping action that depends, for correct operation of said item of software, on data being present, in said first one of said one or more pages, that said item of software has previously written to said first one of said one or more pages and that said item of software expects to be present in said first one of said one or more pages, said data having a characteristic that is present in said first one of said one or more pages but not present in said shadow page, wherein said shadow page is used to translate addresses for said item of software and said first one of said one or more pages is not used to translate addresses for said item of software; and performing the read or write specified in said access request.

15. The method of claim 14, wherein said memory access policy defines a portion of said memory as being inaccessible, wherein said map exposes writeable links to portions of said memory that define virtual address mappings, and wherein said representation of said map does not expose writeable links to portions of said memory that define virtual address mappings.

16. The method of claim 14, wherein said map comprises: (1) a plurality of tables that contain links to a set of said one or more pages, and (2) a directory that contains links to said plurality of tables, said at least one shadow page comprising a shadow directory that differs from said directory in at least the respect that at least one link in the shadow directory points to a shadow page table instead of to one of said plurality of tables.

17. The method of claim 14, wherein said map comprises a plurality of tables that contain links to a set of said one or more pages, wherein said shadow page comprises a representation based on one of said tables, and wherein said shadow page contains a representation of a first link that exists in said one of said tables, wherein said first link is a read/write link in said one of said tables, and wherein said shadow page differs from said one of said tables in that said shadow page's representation said first link is marked read-only.

18. The method of claim 14, wherein said shadow page comprises a directory, wherein said unit of memory is encompassed by a first-sized page that comprises a plurality of second-sized pages, wherein said map comprises a directory that contains a link to said first-sized page, wherein said shadow page is based on said directory, and wherein said shadow page differs from said directory in that said shadow page contains a link to a table instead of a link to said first-sized page, wherein said table contains links to second-sized pages that are included within said first-sized page.

19. A computer-readable storage medium having encoded thereon a data structure that is representative of an address translation map, the address translation map comprising a page directory, the directory comprising links to a plurality of page tables, each of the page tables being stored at a particular frame within said computer-readable medium, each of the page tables comprising links to a plurality of pages of said computer-readable medium, the data structure comprising:

a shadow page table that is based on a first one of the plurality of page tables;

a shadow page directory that is based on the page directory, the page directory comprising a first entry that contains a link to said first one of the plurality of page tables, said shadow page table comprising a second entry that corresponds to the first entry, said second entry containing a link to said shadow page table instead of a link to said first one of the plurality of page tables, there being an item of software that uses said first one of the plurality of page tables to perform a non-address-mapping action that depends, for correct operation of said item of software, on data being present, in said first one of the plurality of page tables, that said item of software has previously written to said first one of the plurality of page tables and that said item of software expects to be present in said first one of the plurality of page tables, said data having a characteristic that is present in said first one of the plurality of page tables but not present in said shadow page table, wherein said shadow page table is used to translate addresses for said item of software and said first one of the plurality of page tables is not used to translate addresses for said item of software.

20. The computer-readable storage medium of claim 19, wherein the first of the plurality of page tables is stored at a first frame, wherein the shadow page table is stored at a second frame, and wherein the shadow page directory differs from the page directory in the respect that a link in the page directory contains an identifier of said first frame and the corresponding link in the shadow page directory contains an identifier of said second frame.

21. The computer-readable storage medium of claim 19, wherein said first of said plurality of page tables contains a link to a first one of the pages, wherein said shadow page table contains a link to a representation based on said first one of the pages instead of the link to the first one of the pages, said representation based on said first one of the pages being stored at a frame different from said first one of the pages.

22. The computer-readable storage medium of claim 21, wherein said first one of the plurality of pages stores either the page directory or said first one of the plurality of page tables.

23. The computer-readable storage medium of claim 22, wherein said first one of the plurality of page tables contains a link that specifies said first one of the plurality of pages as being readable and writeable, and wherein the corresponding link in said shadow page table specifies said first one of the plurality of pages as being only readable.

24. The computer-readable storage medium of claim 19, wherein the page directory and said first one of the plurality of page tables contain at least one feature such that, if used to access a memory based on a virtual address, would result in a violation of a memory access policy, and wherein the shadow page directory and shadow page table contain data such that accessing the memory through said shadow page directory and said shadow page table based on said virtual address does not result in violation of said memory access policy.

* * * * *